No. 732,408. PATENTED JUNE 30, 1903.
W. F. HANSON.
MACHINE FOR MOLDING CRAYONS.
APPLICATION FILED SEPT. 17, 1902.
NO MODEL.
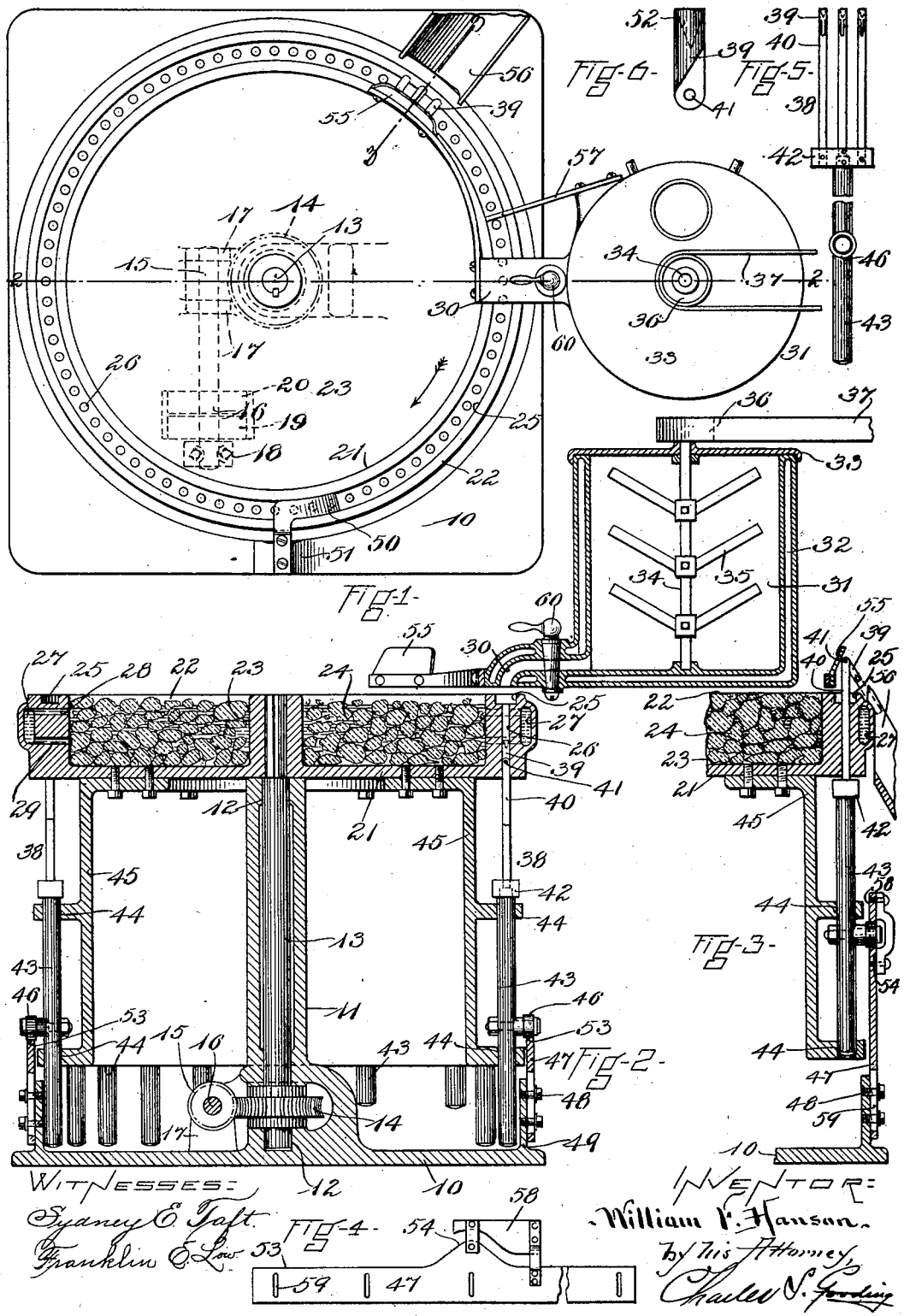

No. 732,408.

Patented June 30, 1903.

UNITED STATES PATENT OFFICE.

WILLIAM F. HANSON, OF LYNN, MASSACHUSETTS.

MACHINE FOR MOLDING CRAYONS.

SPECIFICATION forming part of Letters Patent No. 732,408, dated June 30, 1903.

Application filed September 17, 1902. Serial No. 123,699. (No model.)

*To all whom it may concern:*

Be it known that I, WILLIAM F. HANSON, a citizen of the United States, residing at Lynn, in the county of Essex and State of Massachusetts, have invented new and useful Improvements in Machines for Molding Crayons, of which the following is a specification.

This invention relates to machines for the manufacture of wax crayons, the object being to automatically mold and trim off the buttends of said crayons and to eject said crayons from the mold by means of appropriate mechanism.

The invention consists of a rotary mold provided with a series of recesses to receive the crayon material and mechanism to eject the molded crayons from said recesses, said mechanism consisting of plungers, preferably formed in two parts, one pivoted to the other, and a stationary cam to impart a vertical reciprocatory motion to said plungers during the rotation of said mold.

The invention again consists in the combination and arrangement of parts set forth in the following specification and particularly pointed out in the claims thereof.

Referring to the drawings, Figure 1 is a plan view of my improved machine for molding crayons. Fig. 2 is a vertical longitudinal section taken on line 2 2 of Fig. 1. Fig. 3 is a detail section taken on line 3 3 of Fig. 1. Fig. 4 is a development of the stationary cam by means of which the plungers are raised and lowered. Fig. 5 is a side elevation in detail of a group of plungers and the reciprocatory slide to which they are attached. Fig. 6 is an enlarged side elevation of the upper part of one of the plungers.

Like numerals refer to like parts throughout the several views of the drawings.

In the drawings, 10 is a base-plate, and 11 a column fast thereto or integral therewith. Said column provides bearings 12 12 for the vertical rotary shaft 13. Rotary motion is imparted to the shaft 13 by means of the worm-gear 14, fast thereto and meshing into a worm 15, fast to a horizontal shaft 16, arranged to rotate in bearings 17 17 upon the column 11 and in a cap-bearing 18 upon the base-plate 10. The shaft 16 is rotated by means of the tight and loose pulleys 19 20.

To the upper end of the shaft 13 is fastened a rotary mold 21. Said mold is provided with a flange 22, extending around the periphery thereof and inclosing a chamber 23, in which chamber is placed a freezing mixture 24, of salt and ice. In the upper surface of the flange 22 is provided a groove 25, concentric with the center of the mold 21, and extending downwardly from the bottom of said groove is a series of vertical recesses 26, adapted to receive the crayon material. Around the periphery of the mold and located outside the recesses 26 is a passage 27, connected at intervals with the chamber 23 by means of passages 28 and 29, located, respectively, near the top and bottom of the passage 27 and forming a circulating means whereby the freezing mixture passes through the lower passage 29, around the passage 27, and out through the passage 28 into the chamber 23, said freezing mixture in the chamber 23 and in the passage 27 being for the purpose of cooling the hot-wax compound which enters the groove 25 through a spout 30, provided in a tank 31, filled with the crayon material, which is kept hot by a steam-jacket 32, surrounding the tank 31. The tank 31 is provided with a cover 33 and has in the interior thereof a rotary shaft 34, provided with stirring-arms 35, preferably pointing upward from said shaft. The shaft 34 has a bearing at the upper end in the cover 33 and in the lower end upon the bottom of the tank 31 and is rotated by means of a pulley 36, fast to the upper end thereof and having rotary motion imparted thereto by means of a belt 37.

In each of the vertical recesses 26 is provided a plunger 38, formed in two parts 39 and 40, pivoted to each other at 41, the upper end 39 being provided with a conical recess 52, into which a portion of the material forming the wax crayons flows and forms a point for said crayon. Said plungers are arranged in groups of three and fastened at their lower ends to a cross-bar 42, Fig. 5, said cross-bar being rigidly fastened to a vertical reciprocatory slide 43, arranged to slide in ways 44 44, fast to a bracket 45, said bracket 45 being rigidly fastened to the under side of the rotary mold 21. Each of the slides 43 has a cam-roll 46 rotatably mounted thereon, said roll normally resting upon or traveling along the upper edge of the cylindrical cam-plate 47. The cam-plate 47 is adjustably fastened by screws 48 to a vertical flange 49, extending around the base 10.

A spring-knife 50, supported upon a bracket 51, fast to the base-plate 10, Fig. 1, is arranged with its cutting edge projecting downwardly into the groove 25, and as the mold 21 rotates the ends of the crayons which project into the groove 25 are trimmed off by said knife.

The general operation of the machine is as follows: The material from which the crayons are to be cast is placed in the steam-heated tank 31. Said material is kept constantly agitated by the rotation of the shaft 34 and the stirring-arms 35, fast thereto. The chamber 23 in the mold 21 is filled with a freezing mixture 24, of salt and ice, and is rotated by the worm-gear 14 and worm 15. As the mold rotates the crayon material is allowed to flow from the tank 31 into the groove 25 by opening the stop-cock 60, whereupon said material flows out of the tank 31, through the spout 30, and into said groove. As the mold rotates the material flows downwardly into the recesses 26 and into the conical recess 52 in the upper part 39 of the plungers 38 and the freezing mixture 24 cools the crayon material and the same is solidified to wax crayons. After the crayon has been cast in the mold, as hereinbefore set forth, any portion of the wax which projects beyond the recess and into the groove 25 is trimmed off by the knife 50. The mold continues its rotation in the direction of the arrow, Fig. 1, and the plungers 38, together with the slides 43, remain stationary, the rolls 46 traveling along the horizontal surface 53 of the cam-plate 47 until the said rolls arrive at the raised portion 54, located at the line 3 3, Fig. 1, when said rolls, together with the vertical slides 43 and plungers 38, are raised from the position shown in Fig. 2 to that shown in Fig. 3, and upon a further rotation of the mold said plungers are carried downwardly by the upper cam-plate 58. The plungers in groups of three are thus raised, and as the upper part 39 of each plunger passes out of the recess 26 it is tipped upon its pivot 41, as shown in Fig. 3, by a stationary inclined guide-plate 55, fast to the spout 30 of the tank 31. The crayon falls out of the upper part 39 of the plunger 38 when said part is in the position shown in Fig. 3 and falls into an inclined trough 56 and slides down the same into a box or any desirable receptacle. As the mold continues upon its rotary motion a finger 57, fast to the tank 31, projects downwardly into the groove 25 and prevents any wax or other material from passing beneath the same when coming from the spout 30.

It is desirable in a machine of this construction to cast or to mold crayons of different lengths, and in order to adapt the machine to this function the cam-plate 47 is made adjustable upon the flange 49, being slotted at 59 to allow said cam-plate to be raised and lowered, and after being adjusted to the proper position said cam-plate is fastened rigidly to the flange 49 by means of the screws 48.

Having thus described my invention, what I claim, and desire by Letters Patent to secure, is—

1. In a machine for molding crayons, a rotary mold provided with an annular groove in its upper surface, concentric with said mold, and with a series of vertical recesses to receive the crayon material extending downwardly from said groove, and means for ejecting the molded crayons from said recesses.

2. In a machine for molding crayons, a rotary mold provided with a series of vertical recesses to receive the crayon material arranged concentrically therewith, a plunger in each of said recesses, said plungers each formed in two parts, pivoted together, and mechanism to reciprocate said plungers and eject the molded crayons from said recesses.

3. In a machine for molding crayons, a rotary mold provided with a series of vertical recesses to receive the crayon material arranged concentrically therewith, a plunger in each of said recesses, said plungers each formed in two parts, pivoted together, the upper part of each plunger provided with a conical recess in the top thereof, and mechanism to reciprocate said plunger and eject the molded crayons from said vertical recesses.

4. In a machine for molding crayons, a rotary mold provided with: a series of vertical recesses to receive the crayon material, arranged concentrically with said mold, a chamber located inside said vertical recesses adapted to contain a freezing mixture, an outer passage extending around said mold, outside said vertical recesses, a passage connecting said outer passage and chamber, whereby a circulation of said freezing mixture from said chamber and through said passage is established.

5. In a machine for molding crayons, a rotary mold provided with a series of vertical recesses to receive the crayon material, arranged concentric with said mold, and a stationary knife located with its cutting edge in position to come in line with the tops of said recesses as said mold is rotated for the purpose specified.

6. In a machine for molding crayons, a rotary mold provided with a series of vertical recesses to receive the crayon material, arranged concentrically therewith, a plunger in each of said recesses, said plungers each formed in two parts pivoted together, mechanism to move said plungers upwardly in said recesses, and a stationary guide arranged to engage the upper part of said plunger during its upward movement for the purpose specified.

7. In a machine for molding crayons, a rotary mold, provided with an annular groove in its upper surface concentric with said mold and with a series of vertical recesses to receive the crayon material extending downwardly from said groove, means for ejecting the molded crayons from said recesses, and a tank adapted to contain heated crayon material and arranged to deliver said crayon material into said groove.

In testimony whereof I have hereunto set my hand in presence of two subscribing witnesses.

WILLIAM F. HANSON.

Witnesses:
CHARLES S. GOODING,
FRANKLIN E. LOW.